INVENTOR
Walker E. Rowe
ATTORNEY

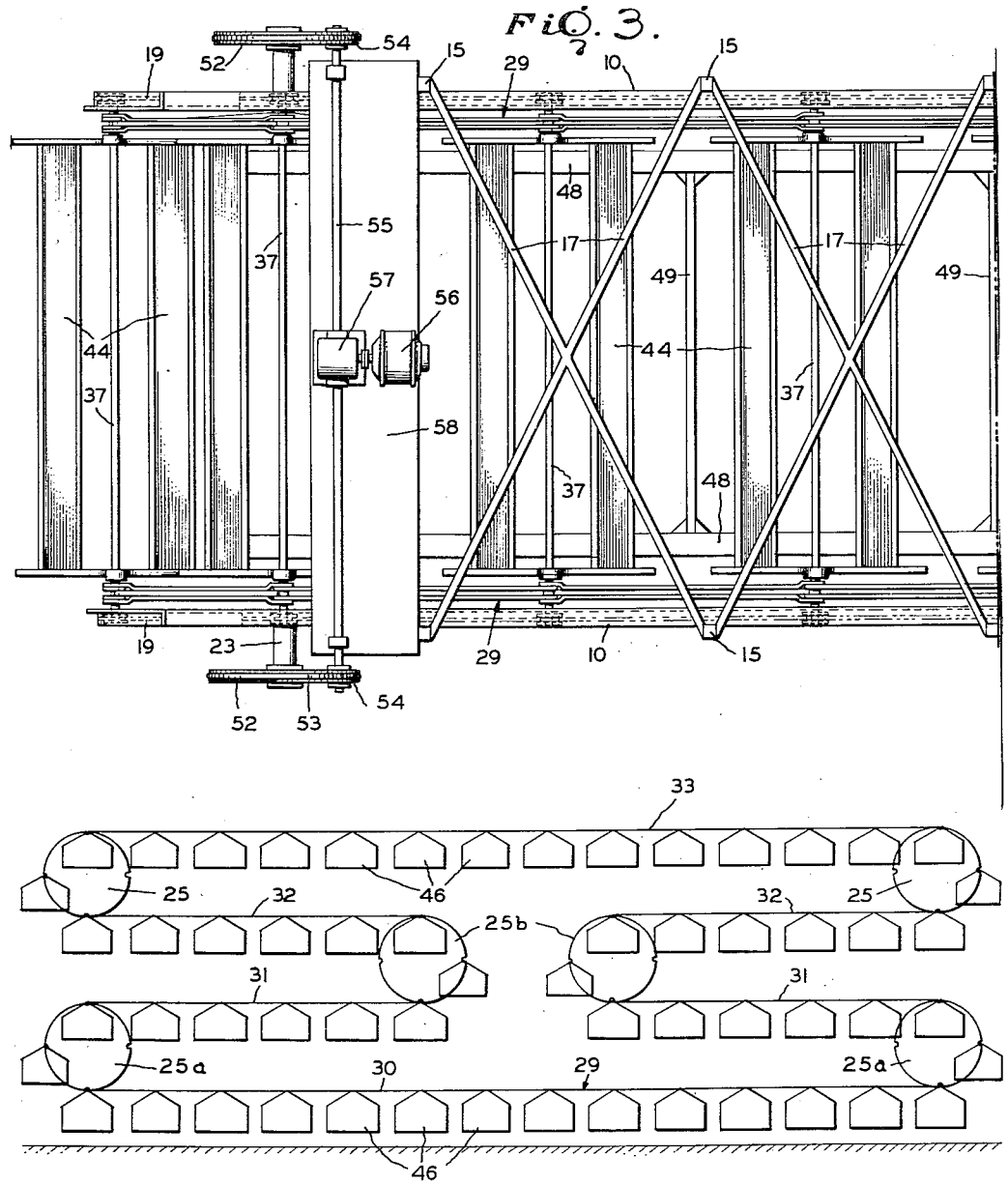

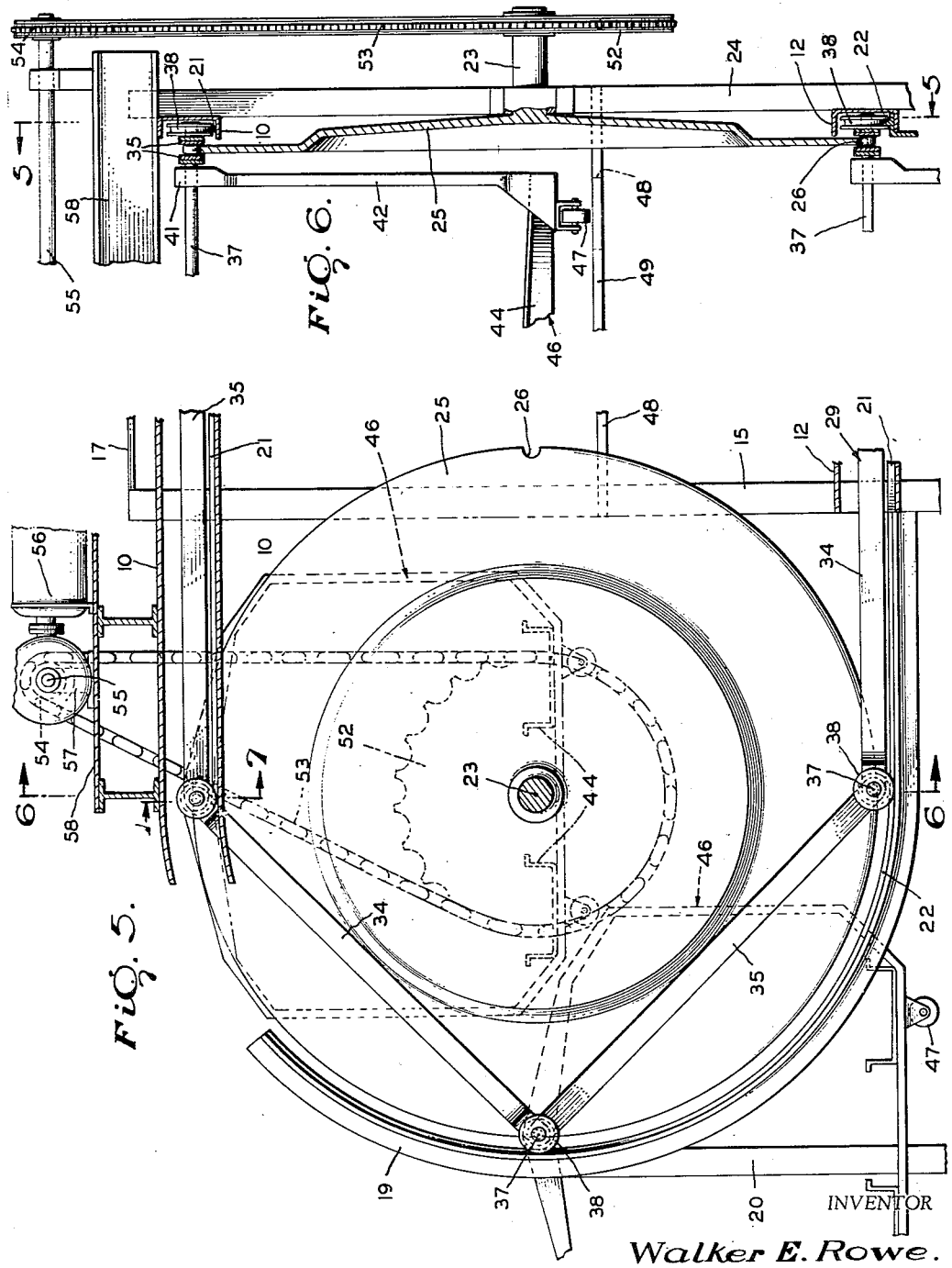

June 4, 1957 W. E. ROWE 2,794,559
AUTOMOBILE PARKING AND STORAGE APPARATUS
Filed Aug. 11, 1954 5 Sheets-Sheet 5
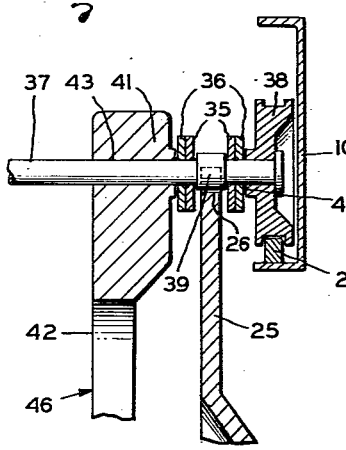
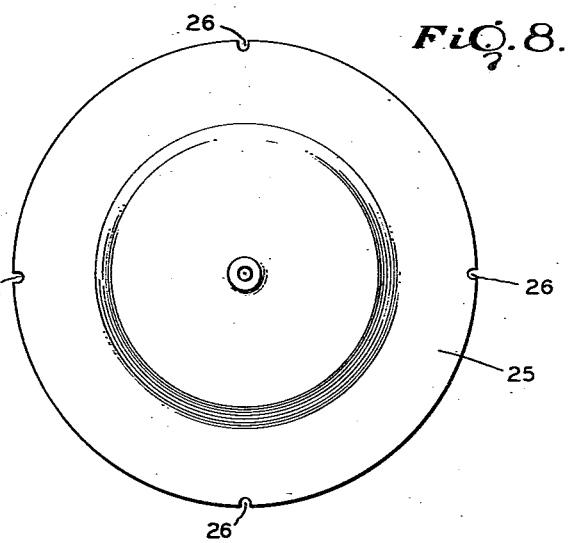
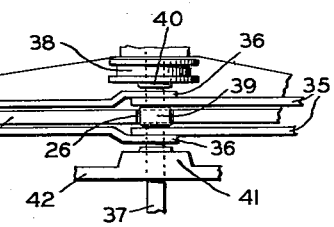
INVENTOR
Walker E. Rowe.
BY
ATTORNEY

United States Patent Office 2,794,559
Patented June 4, 1957

2,794,559

AUTOMOBILE PARKING AND STORAGE APPARATUS

Walker E. Rowe, Georgetown, S. C.

Application August 11, 1954, Serial No. 449,067

3 Claims. (Cl. 214—16.1)

My invention relates to parking and storage apparatus for automobiles.

This application is a continuation-in-part of my application for Automobile Parking and Storage Apparatus, Serial Number 369,632, filed July 22, 1953, and now abandoned.

A primary object of the invention is to provide automobile parking and storage apparatus which may be built so as to embody a plurality of stories or tiers, such as four or more stories or tiers, and which also may be built in substantially any desired length horizontally, so as to accommodate a maximum number of automobiles in a given space available for building the apparatus.

A further important object is to provide parking and storage apparatus embodying simplified flexible driving elements or chains which are extremely strong and durable, and means for relieving these flexible elements from excessive strain when the automobiles are elevated and lowered.

Another object is to provide in apparatus of the above-mentioned character means to eliminate excessive swaying of the individual automobile carriages or racks as they travel about the apparatus, and means to steady each rack while the automobile is being driven onto the same at the loading station.

A further object is to provide driving chains of relatively light weight, which will be inexpensive to manufacture and maintain, as compared to conventional heavyweight sprocket chains commonly employed in apparatus of this character.

Other objects and advantages of the invention will be apparent during the course of the following description.

Figure 1:
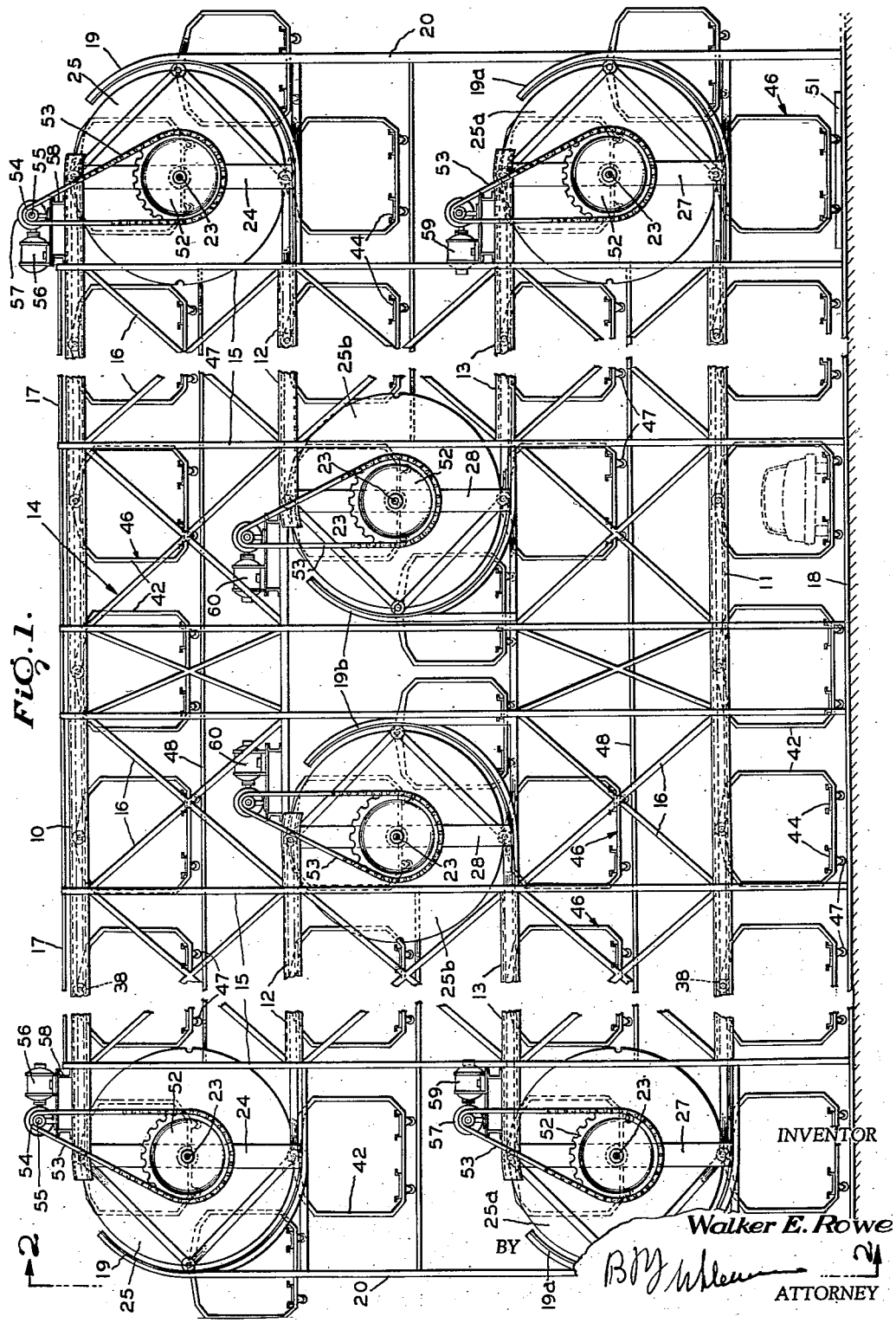
Figure 2:
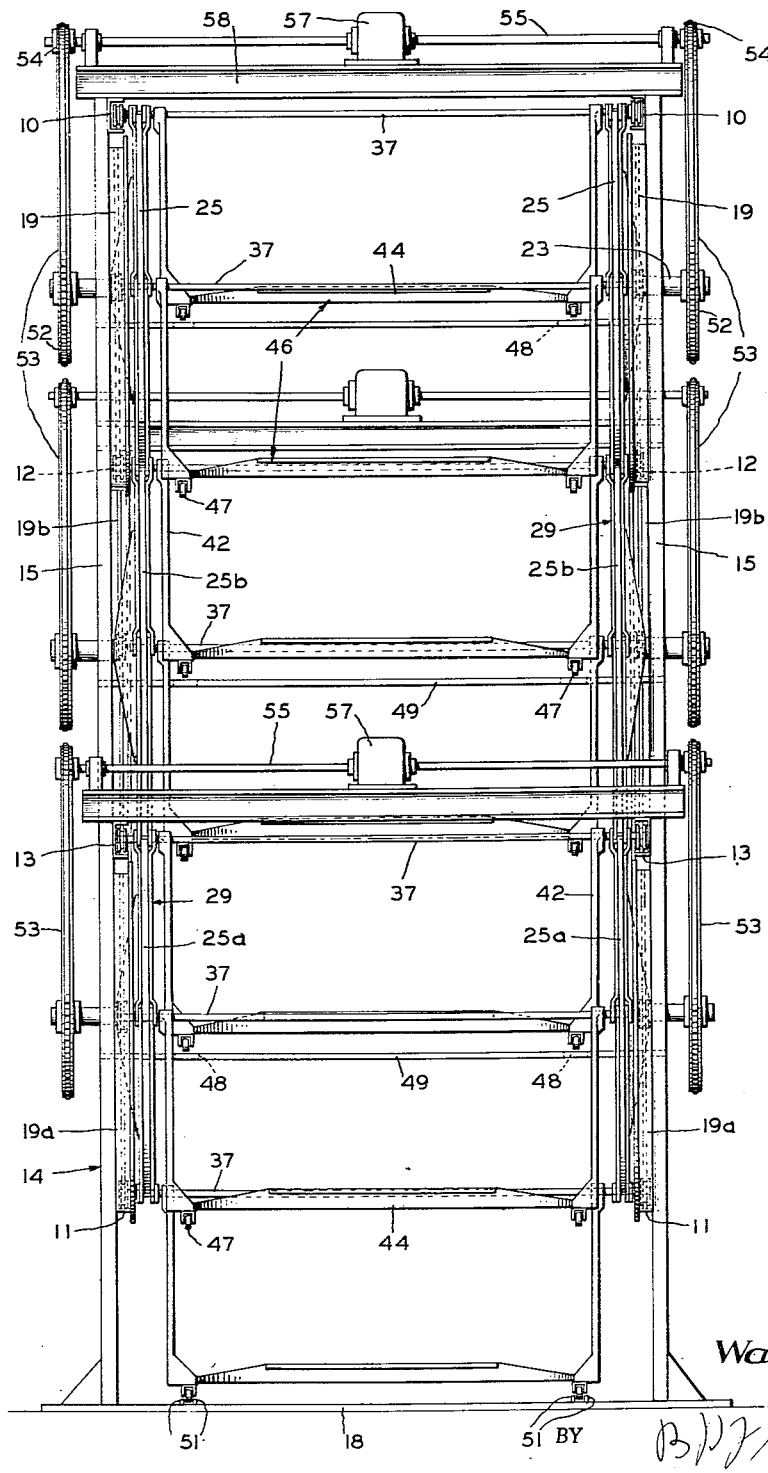

In the accompanying drawings, forming a part of this application, and in which like numerals are employed to designate like parts throughout the same, Figure 1 is a side elevation of apparatus embodying my invention, parts broken away, Figure 2 is an end elevation of the apparatus taken on line 2—2 of Figure 1, on an enlarged scale, Figure 3 is a fragmentary plan view of the apparatus as shown in Figure 2, Figure 4 is a diagrammatic side elevation of the apparatus, Figure 5 is a fragmentary vertical section taken on line 5—5 of Figure 6, Figure 6 is a fragmentary vertical section taken on line 6—6 of Figure 5, Figure 7 is a further enlarged fragmentary vertical section taken on line 7—7 of Figure 5, parts omitted, Figure 8 is a reduced side elevation of a drive wheel of the apparatus, Figure 9 is a fragmentary plan view of a driving chain and associated elements, and Figure 10 is a side elevation of an individual automobile carriage or rack at the loading station showing the means for steadying or stabilizing the carriage at this point.

In the drawings, where for the purpose of illustration is shown a preferred embodiment of my invention, the numeral 10 designates a pair of top horizontal rails or beams, and the numeral 11 a pair of bottom horizontal rails or beams. These rails 10 and 11 are preferably U-shaped in cross section, as best shown in Figure 7. Arranged near and beneath the top rails 10 are pairs of upper intermediate horizontal rails 12, and arranged near and above the bottom rails 11 are pairs of lower intermediate horizontal rails or beams 13. The rails 12 and 13 are also U-shaped in cross section and identical with each other and with the rails 10 and 11, except that these rails 12 and 13 are shorter than the rails 10 and 11. The pairs of rails 12 have their inner ends spaced apart, and the pairs of rails 13 have their inner ends spaced, as shown.

A vertical frame 14 is provided for supporting the horizontal rails 10, 11, 12 and 13, and this frame comprises vertical uprights 15, rigidly secured to the outer sides of the horizontal rails by welding or the like. The uprights 15 of the vertical frame 14 are reinforced by suitable diagonal braces 16, arranged in a vertical plane and having their ends rigidly secured by welding or the like to the uprights or other parts of the frame 14. Horizontal diagonal braces 17 are preferably provided slightly above the tops of the horizontal rails 10, with their ends rigidly secured by welding to the tops of the uprights 15. The horizontal braces 17 thus serve to tie the two vertical sides of the frame 14 together at its top. The lower ends of the uprights 15 may also be rigidly connected by a suitable horizontal base member or brace 18, if desired. The lower ends of the uprights 15 may also be anchored in any other preferred manner.

The top and bottom rails 10 and 11 extend continuously for substantially the entire horizontal length of the frame 14, while the intermediate horizontal rails 12 and 13 are interrupted with their inner ends spaced apart somewhat near the longitudinal center of the frame 14, as previously stated. The rails 12 and 13 also extend throughout a major portion of the length of the frame 14. In this connection, it should be understood that the apparatus including the rails 10, 11, 12 and 13 and the frame 14 including the uprights 15 may be built in substantially any desired length horizontally, which length may be widely varied in accordance with space limitations. Also, while I have shown an apparatus composed of four stories or tiers made up of the rails 10, 11, 12 and 13 for supporting four courses or runs of automobile carrying racks, yet it will be understood that the number of stories or tiers may be increased or decreased as desired.

Arranged at the outer ends of the rails 10 and 12 are pairs of curved rails 19, which are identical, and preferably L-shaped in cross section, and arranged in vertical planes. The rails 19 are rigidly secured at their ends to the endmost pairs of uprights 15, and at their outer sides to auxiliary uprights 20 included in the frame 14. The curved rails 19 form continuations of the horizontal rails 12, as shown. Horizontal track elements 21, Figures 5 and 6 are rigidly mounted upon the lower horizontal webs of the rails 12, and these track elements 21 lead smoothly onto track elements 22, which are rigidly mounted upon the curved rails 19 and coextensive therewith. The rails 12 and 19 and their track elements 21 and 22 thus form tracks having upstanding circularly curved portions at their opposite ends, Figure 1.

Curved rails 19a are arranged at the opposite ends of the horizontal rails 11 and are identical with the rails 19. The rails 11 have the same track elements 21 and the rails 19a have the same track elements 22 as the corresponding rails 12 and 19. Pairs of curved bars or rails 19b, identical with the rails 19 and 19a are arranged at the inner ends of the lower intermediate rails 13, as shown in Figure 1. The curved rails 19b are rigidly secured to the frame 14 and to the inner ends of the rails 13 by welding or the like. The same track elements 21 are carried by the horizontal rails 13 as by the rails 11 and 12, and the same track elements 22 are carried by the curved rails 19b as by the rails 19 and 19a. The curved rails 19b and their track elements form with the horizontal rails 13 and their track elements, tracks having upwardly extending circularly curved portions at their inner ends, and spaced apart longitudinally of the frame 14. The upper horizontal rails 10 are also equipped throughout their lengths with the same longitudinal track elements 21 as the rails 11, 12 and 13.

Arranged near and beneath the opposite ends of the top rails 10 are horizontal transverse shafts 23, Figures 5 and 6, journaled in suitable bearings, carried by the vertical bars 24, rigidly secured to the frame 14, as shown. There is a pair of the shafts 23 at the corresponding ends of the rails 10, extending outwardly of the members 24 for a relatively short distance. The shafts 23 have lifting and lowering wheels 25 rigidly secured to them for rotation in vertical planes, and the wheels 25 are arranged just inwardly of the frame members 24 and uprights 15, as shown in the drawings. The peripheries of the wheels 25 are inwardly offset so as to be arranged inwardly of the upper rails 10, Figures 6 and 7, and the wheels 25 are provided in their peripheries with notches 26, preferably spaced 90 degrees apart. The wheels 25 are of such size or diameter that they extend for the entire vertical distance between the top rails 10 and upper intermediate rails 12. There are pairs of wheels 25 near the opposite ends of the upper horizontal rails 10, inwardly of and concentric with the curved rails 19.

The numeral 25a designates pairs of wheels which are identical with the wheels 25, and arranged near the ends of the bottom horizontal rails 11, inwardly of and concentric with the curved rails 19a. Pairs of wheels 25b are arranged adjacent to the inner ends of the horizontal rails 13 and 12, inwardly of and concentric with the curved rails 19b. All of the wheels 25, 25a and 25b are in the vertical planes of the curved rails 19, 19a and 19b. Each pair of wheels 25, 25a and 25b are carried by the identical horizontal shafts 23 shown in Figure 6. The shafts 23 of the wheels 25a are journaled within fixed bearings carried by vertical frame members 27 rigidly secured to the frame 14, and the shafts 23 of wheels 25b are journaled in fixed bearings carried by vertical frame members 28, likewise rigidly secured to the frame 14 in any suitable manner. The mounting of all of the wheels is thus identical with the construction shown and described in Figures 5 and 6 in connection with the wheels 25 near the opposite ends of the upper rails 10.

The apparatus further comprises a pair of endless chains or flexible elements 29, Figure 4, passed about the pairs of wheels 25a to form a bottom run 30, and then upwardly over the wheels 25a to form lower intermediate runs 31, and then about the inner sides of the wheels 25b and upwardly over these wheels to form upper intermediate runs 32, and then about the top wheels 25 to form top runs 33, as best shown in diagrammatic Figure 4.

Each endless chain 29 comprises a plurality of pairs of long links 34 and 35, and each link 34 and 35 is equal in length to the chordal distance between the notches 26 of the wheels 25, 25a and 25b, as best illustrated in Figure 5. The links 34 and 35 are identical, except that the links 34 have outwardly offset end portions 36, arranged outwardly of the straight links 35, so that the body portions of all links are in longitudinal alignment, Figure 9. The adjacent ends of the pairs of links 34 and 35 of each endless chain 29 are pivotally connected by transverse horizontal shafts or pins 37, which extend for the full transverse distance between the respective horizontal rails 10, 11, 12 and 13, Figure 2. The end portions of all links 34 and 35 are aperatured to pivotally receive the transverse shafts 37. The links 34 and 35 of the pairs of links in each chain 29 straddle the peripheral portions of the several wheels 25, 25a and 25b, as shown in the drawings, so that one link of each pair of links 34 and 35 is arranged close to the inner side of the wheels, and the other link of each pair lies close to the outer side of the wheels.

The shafts 37 extend slightly outwardly of the chains 29 at both sides of the apparatus, and each shaft 37 carries at its ends grooved rollers 38, which engage and roll along the track elements 21 and 22 of the several horizontal rails 10, 11, 12 and 13 and the several curved rails 19, 19a and 19b. The grooved rollers 38 lie close to the inner faces of the vertical webs of the horizontal rails 10, 11, 12 and 13, as best shown in Figure 7.

The shafts 37 are preferably provided near their opposite ends and between each pair of links 35, Figure 7, with enlargements 39, adapted to engage within the notches 26 of the several wheels. The enlargements 39 also serve to maintain the links 35 properly spaced apart, and the links 34 are restrained against separating laterally by the hubs 40 of the grooved rollers 38, and by hubs 41 of carrying yokes to be described, Figure 7. It is thus seen that the endless chains 29 composed of the links 34 and 35 are arranged in horizontal runs as shown in Figure 4, with the several runs arranged just inwardly of the grooved rollers 38 which travel upon the several horizontal rails 10, 11, 12 and 13. The transverse horizontal shafts 37 connect or articulate the links 34 and 35, and extend for substantially the entire distance between adjacent pairs of the horizontal rails 10, 11, 12 and 13. The rollers 38 support the chains 29 and shafts 37, and the several horizontal rails support the rollers 38 as they travel about the apparatus.

Pivotally suspended from the shafts 37 are yokes 42, provided at their tops with the hubs 41 having openings 43, pivotally receiving the shafts 37, Figure 7. The yokes 42 are arranged in transverse pairs, in vertical planes, and each pair of yokes is rigidly connected at its lower end by transverse horizontal channels or tracks 44, spaced apart laterally a suitable distance to receive the wheels of an automobile. Each pair of channels 44 is provided near corresponding ends with arcuate depressions 45, adapted to receive and steady the front wheels of the automobile, as shown in Figure 10. The yokes 42 and channels 44 thus form racks or carriers 46 for the automobiles to be parked or stored by the apparatus.

When each rack 46 approaches any pair of wheels 25, 25a or 25b, the shaft enlargements 39 enter the notches 26 of the adjacent pair of wheels, and hence the load of the rack and automobile is transmitted to the lifting and lowering wheels which are power operated in a manner to be described for raising and lowering the rack and the automobile thereon. When the racks 46 are traveling longitudinally of the horizontal rails 10, 11, 12 and 13, the rollers 38 travel upon the horizontal rails and hence the load is transmitted directly to the rails or tracks. The chains 29 are thus relieved at all times from lifting the weight of the automobiles and racks, and the chains need only be loaded to the extent necessary to pull the racks horizontally along the rails 10, 11, 12 and 13 upon the rollers 38.

Means are provided to prevent each rack 46 from swinging or swaying too much about the shaft 37 from which it is suspended. This means comprises rollers 47, mounted upon the bottom of each rack 46 near both ends and near the sides or corners of the same. These rollers 47 extend below the racks 46 somewhat, and are spaced slightly above horizontal longitudinal sway preventing tracks 48, which are rigidly secured to the frame 14 at the proper elevations beneath the runs or courses of racks 46. The several horizontal sway preventing tracks 48 may be rigidly connected by suitable transverse horizontal braces 49, as shown. The rollers 47 of the lower run of racks 46 are spaced slightly above the horizontal base 18, and may engage the same to prevent excessive swaying of the racks near the bottom of the apparatus. The rollers 47 engage the tracks 48 in like manner to prevent excessive swaying of the upper runs or courses of the racks 46, as stated. The tracks 48 will thus check the swinging or swaying of the racks 46, but will not prevent the continued longitudinal movement of the racks with the chains 29 to which they are attached, since the rollers 47 are spaced slightly above the tracks 48 and base 18.

Means are also provided at a selected loading point for the automobiles to which each rack 46 will in turn come, for preventing longitudinal movement of the racks as the automobile rolls onto the same. At the loading point, which may be, for example, the position of the rack 46 at the lower right hand corner of the apparatus in Figure 1, a suitable loading ramp 50, Figure 10, may be provided. At the loading point, Figures 1 and 10, pairs of low guide bars 51 are rigidly secured to the base 18 and extend longitudinally for a sufficient distance to receive all of the rollers 47 between the pairs of bars 51. The bars 51, as shown in Figure 1, may extend for substantial distances between the uprights 20 and 15 near the right hand end of the apparatus. When the rollers 47 thus enter between the bars 51 at the loading point, the rack 46 cannot sway longitudinally when the automobile is driven up the ramp 50 and onto the channels 44.

The shafts 23 in each pair have sprocket wheels 52 rigidly mounted thereon. The sprocket wheels 52 of the wheels 25 are driven by sprocket chains 53, extending upwardly and engaging sprocket wheels 54, carried by transverse horizontal shafts 55, driven by motors 56 through suitable reduction gearing 57. The motors 56 and gearing 57 are rigidly mounted upon suitable horizontal transverse platforms 58, atop the upper horizontal rails 10 and rigidly secured thereto near the opposite ends of the same. The shafts 23 of the pairs of wheels 25 near the ends of the rails 10 are thus driven by identical and duplicate means. Motors 59 are arranged near the outer ends of the horizontal rails 13 and are suitably mounted thereon and drive the shafts 23 of the wheels 25a by the identical means including the sprocket chains 53, gearing 57, shafts 55, sprocket wheels 52 and associated elements. Motors 60 are similarly mounted on the frame 14 adjacent the inner ends of the rails 12, Figure 1, and drive the shafts 23 of the wheels 25b by the identical means, including the sprocket chains 53 and associated elements described above in connection with the driving of the other wheels 25 and 25a. Each pair of wheels 25, 25a and 25b is thus driven by identical and duplicate means. The motors 56 and 59 rotate in the same direction and are synchronized to drive at the same speed. The motors 60 rotate in the same direction with respect to each other but in the opposite direction with respect to the motors 56 and 59. All of the motors 56, 59 and 60 are synchronized to drive or rotate at the same speed, however. As is obvious, suitable electrical circuits will be provided for controlling the operation and synchronizing of the several motors, so that the endless chains 29 may be advanced at a suitable speed in either direction and stopped and started at will.

The operation of the apparatus is as follows:

When the endless chains 29 and the several driving wheels are at rest, automobiles are driven onto the racks 46 of the lowermost run of racks at a selected loading station such as indicated at the lower right hand corner of Figure 1. As previously stated, the stop bars 51 will now coact with the rollers 47 of each rack to prevent the racks from shifting longitudinally when the automobiles are driven thereon. The several synchronized driving motors are now operated to advance the endless chains 29, the lower runs 30 of which may be driven to the left, Figures 1 and 4. Each rack 46 may be brought to rest at the loading station, at the will of the operator for driving an automobile onto the same. As the lower runs 30 of the chains advance to the left, Figures 1 and 4, each rack 46 of the lower run 30 will be brought adjacent to the pair of wheels 25a, and the enlargements 39 of each shaft 37 will enter the notches 46 of the wheels 25a. The rollers 38 travel along the track elements 22 of the curved rails 19a, in the upward direction, and the curved rails serve to retain or hold the enlargements 39 within the notches 26. As each rack 46 continues to rise, more of its weight is transferred from the curved rails 19a to the wheels 25a. Since these wheels 25a are power driven, they will carry the load of each rack and automobile and relieve the chains 29 of the load. Further rotation of the wheels 25a will cause the rollers 38 to travel to the right upon the track elements 21 of the horizontal rails 13 at the left hand side of the apparatus, Figure 1. The runs 31 to the left now advance the racks 46 toward the wheels 25b to the left, and the notches 26 of these wheels will now pick up the enlargements 39 of each shaft 37 and carry each rack upwardly and transfer its rollers 38 to the horizontal rails 12, to the left in Figure 1. Further movement of the chains 29 in the same direction advances the racks 46 to the wheels 25 to the left, and these wheels receive the shaft enlargements 39 in their notches 26 and elevate the racks and transfer their rollers 38 to the track elements 21 of the upper horizontal rails 10. The rollers 38 will then travel longitudinally to the right, Figure 1, upon the rails 10.

When the opposite or right hand end of the frame 14 is reached, the other wheels 25, 25b and 25a to the right manipulate the chains and racks in the same manner above described, except that they lower the racks instead of raising them. Since all of the wheels are power driven and synchronized, they will absorb the direct weight of the racks and automobiles being raised and lowered, and the chains 29 are thus relieved of excessive strain. The chains are employed for moving the racks 46 horizontally along the several horizontal rails 10, 11, 12 and 13, and this does not place excessive strain upon the chains. All of the curved rails, 19, 19a and 19b coact with the shaft enlargements 39 and rollers 38, as above described, to maintain the shaft enlargements firmly within the notches 26 of the wheels during the raising and lowering of the racks and automobiles by the power driven wheels.

It should be obvious that the endless chains 29 may be driven in either direction, for raising or lowering the racks. As the racks 46 are loaded, they are shifted to an elevated position to bring empty racks to the lower or loading position. The endless chains 29 may be driven any desired distance to return the loaded racks to the lowermost position.

It should be emphasized that the notches 26 of each driving wheel are spaced apart distances corresponding to the lengths of the long chain links 34 and 35. Each of these links is sufficiently long, such as ten feet, to reach from the center or shaft 37 of one rack 46 to the center or shaft of the next adjacent rack. With this arrangement, corresponding pairs of links in each chain 29 support a pair of the racks 46 at their ends, and each chain link or section comprises a pair of the bars or links 34 or 35, arranged upon opposite sides of the power driven wheels, as previously pointed out. The links 34 and 35 upon opposite sides of the wheels 25, 25a and 25b are close to the wheels and may substantially slidably contact the same, thus preventing appreciable lateral shifting of the endless flexible elements or chains 29.

It is to be understood that the form of the invention, herewith shown and described is to be taken as a preferred example of the same, and that various changes in the shape, size and arrangement of parts may be resorted to, without departing from the spirit of the invention or scope of the subjoined claims.

Having thus described my invention, I claim:

1. Automobile parking and storage apparatus comprising a plurality of pairs of substantially horizontal guide rails arranged in spaced superposed relation, pairs of wheels arranged near the ends of said guide rails for rotation in substantially vertical planes and provided in their peripheries with spaced notches, a pair of endless flexible elements to pass about the pairs of wheels and including substantially horizontal runs for movement longitudinally of the guide rails, transverse shafts extending between and connected with said flexible elements and spaced apart longitudinally of the flexible elements, rollers carried by the ends of the shafts and engaging the guide rails to travel thereon and spaced outwardly of the flexible elements, generally U-shaped automobile carrying racks including substantially vertical sides having openings near their upper ends, said openings pivotally receiving the vertical sides of the racks for suspending the racks from the transverse shafts, said sides being disposed inwardly of the flexible elements and wheels, curved guide rails arranged adjacent corresponding portions of the peripheries of said wheels and forming continuations of said substantially horizontal guide rails, said shafts engaging the notches of the wheels and the rollers engaging the curved guide rails when the wheels are elevating or lowering the racks, and means for driving at least one pair of said wheels.

2. Automobile parking and storage apparatus comprising upper and lower pairs of substantially horizontal guide rails, pairs of wheels arranged near the ends of the guide rails for rotation in substantially vertical planes and having spaced notches in their peripheries, a pair of endless flexible elements to pass about said wheels and including upper and lower runs for movement longitudinally of the guide rails, each endless flexible element comprising laterally spaced pairs of links arranged upon opposite sides of and close to the wheels and adapted to overlie peripheral portions of the wheels while passing about the same, transverse shafts extending between the endless flexible elements and connecting corresponding ends of the pairs of links of said elements and engaging the notches of said wheels between the links of each pair, means for maintaining said shafts in engagement with the notches of the wheels when the flexible elements are passing thereabout, rollers secured to the shafts outwardly of the flexible elements and engaging the guide rails to travel thereon, automobile carrying racks suspended from the transverse shafts inwardly of the flexible elements and wheels, and means to drive at least one pair of said wheels.

3. Automobile parking and storage apparatus comprising upper and lower pairs of substantially horizontal guide rails, pairs of wheels arranged near the ends of the guide rails for rotation in substantially vertical planes and having narrow peripheral parts, said narrow peripheral parts being arranged near and inwardly of said guide rails, a pair of endless flexible elements to travel along the guide rails and around said wheels, each endless flexible element including laterally spaced pairs of links arranged upon opposite sides of and close to the narrow peripheral portions of the wheels, transverse horizontal shafts extending between said flexible elements and connecting corresponding ends of the pairs of links of the flexible elements and operatively engaging the peripheries of said wheels between the links of each pair, rollers secured to the ends of said shafts outwardly of and close to the flexible elements and engaging said guide rails, automobile carrying racks including vertical sides having openings, said vertical sides being arranged near and inwardly of said flexible elements, said openings receiving the transverse shafts for suspending the racks therefrom, and means to drive at least one pair of said wheels.

References Cited in the file of this patent

UNITED STATES PATENTS

| | | |
|---|---|---|
| 486,809 | McCaslin | Nov. 22, 1892 |
| 630,804 | Decker | Aug. 8, 1899 |
| 694,767 | Mahoudeau | Mar. 4, 1902 |
| 1,178,408 | Paris | Apr. 4, 1916 |
| 1,524,505 | Blue | Jan. 27, 1925 |
| 1,799,924 | Muzyn | Apr. 7, 1931 |
| 1,882,656 | Creedon | Oct. 18, 1932 |
| 2,132,362 | Regan | Oct. 4, 1938 |

FOREIGN PATENTS

| | | |
|---|---|---|
| 353,900 | Great Britain | July 27, 1931 |
| 719,154 | Germany | Mar. 30, 1942 |